United States Patent [19]
Lorraine et al.

[11] Patent Number: 5,970,953
[45] Date of Patent: Oct. 26, 1999

[54] HIGH PRESSURE INJECTOR CLIP

[75] Inventors: Jack R. Lorraine; Steve Bugos, both of Newport News; Ray Thomas Wildeson, Yorktown, all of Va.

[73] Assignee: Siemens Automotive Corporation, Auburn Hills, Mich.

[21] Appl. No.: 09/229,153

[22] Filed: Jan. 12, 1999

[51] Int. Cl.⁶ .................................................. F02M 37/04
[52] U.S. Cl. ............................................ 123/470; 123/456
[58] Field of Search .................................... 123/468, 469, 123/470, 456; 239/600

[56] References Cited

U.S. PATENT DOCUMENTS

| | | | |
|---|---|---|---|
| 4,294,215 | 10/1981 | Hans et al. | 123/470 |
| 4,984,548 | 1/1991 | Hudson, Jr. | 123/456 |
| 5,136,999 | 8/1992 | Bassler et al. | 123/470 |
| 5,167,213 | 12/1992 | Bassler et al. | 123/470 |
| 5,301,647 | 4/1994 | Lorraine | 123/470 |
| 5,501,195 | 3/1996 | Hall | 123/470 |
| 5,803,052 | 9/1998 | Lorraine et al. | 123/470 |
| 5,893,351 | 4/1999 | Akutagawa et al. | 123/470 |

*Primary Examiner*—Thomas N. Moulis

[57] ABSTRACT

A spring clip includes a first portion including a bridge connecting spaced elongate fingers adapted to straddle a body portion of the fuel injector and be receivable in a receiving portion of a fuel rail cup. The elongate fingers include a reverse bend at a midpoint therealong and terminate in a bridging portion. The bent elongate fingers define finger segments on each side of the reverse bend. The finger segments diverge from the reverse bend part way toward the bridge and bridging portions and converge thereafter to form generally diamond shaped spring elements. A second portion of a generally planar shape having spaced legs engages slots in the injector body. The second portion includes a wall portion extending generally perpendicular to the spaced legs and connects with the bridging portion. When the injector is mounted in the fuel rail cup, the legs are received in slots in the injector body and the elongate finger segments are compressed between the fuel rail cup and the injector body. The fuel injector is clamped between the legs and the fingers with a force toward the head of the engine by the compressive load of the finger segments. The clip is yieldable to avoid overloading the injector during installation in the engine.

8 Claims, 4 Drawing Sheets

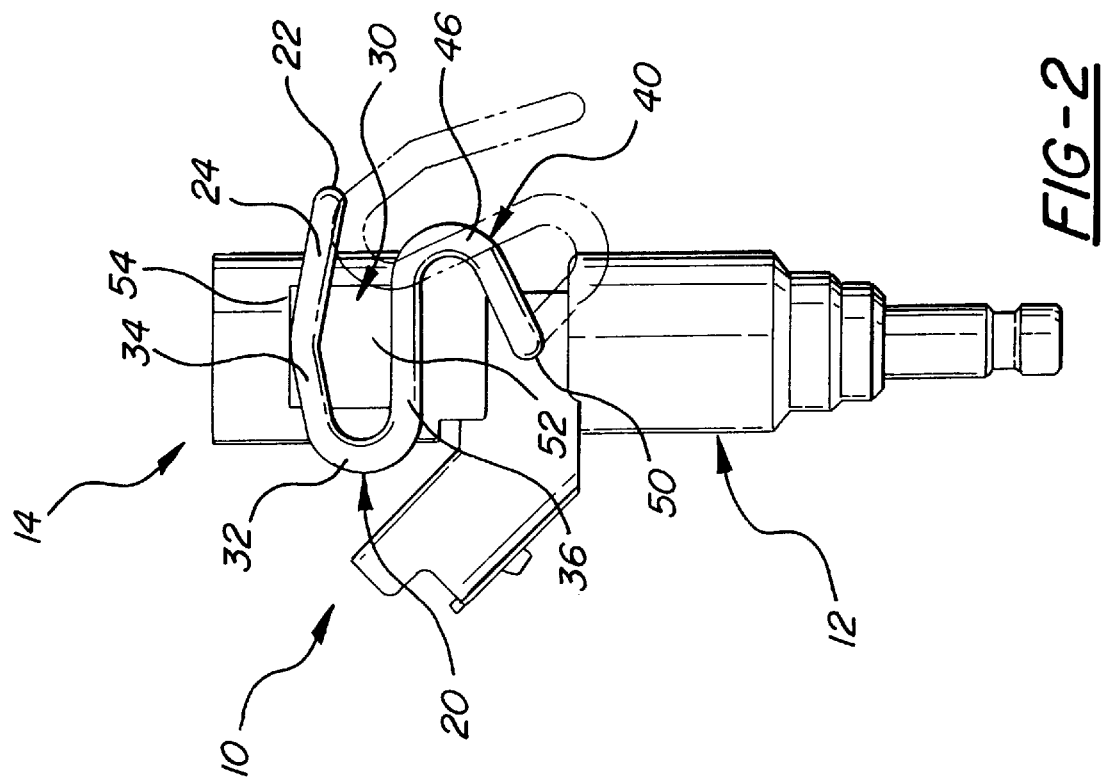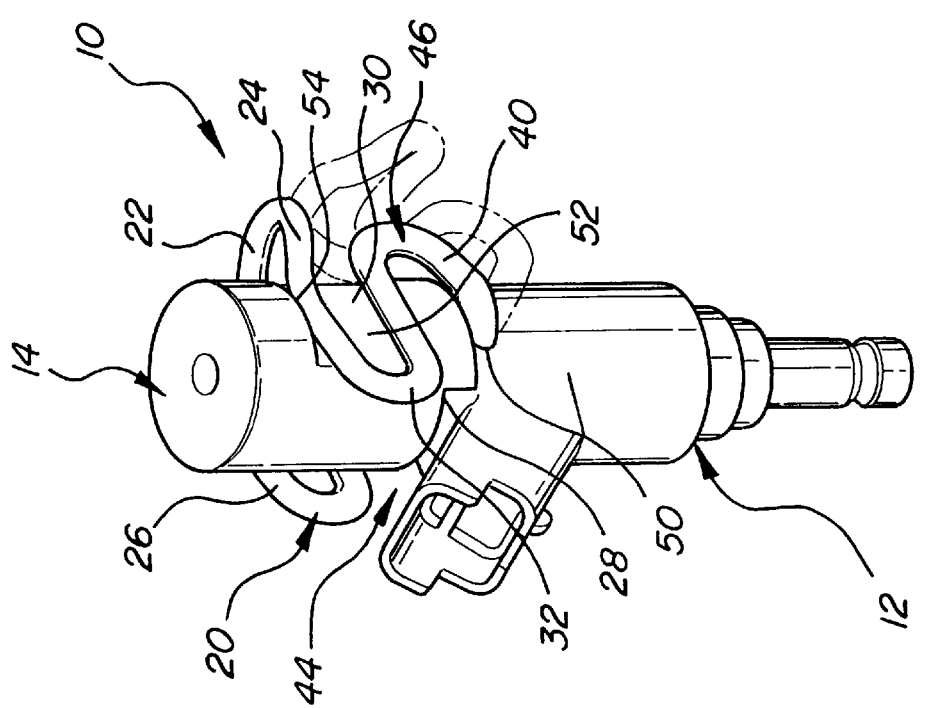

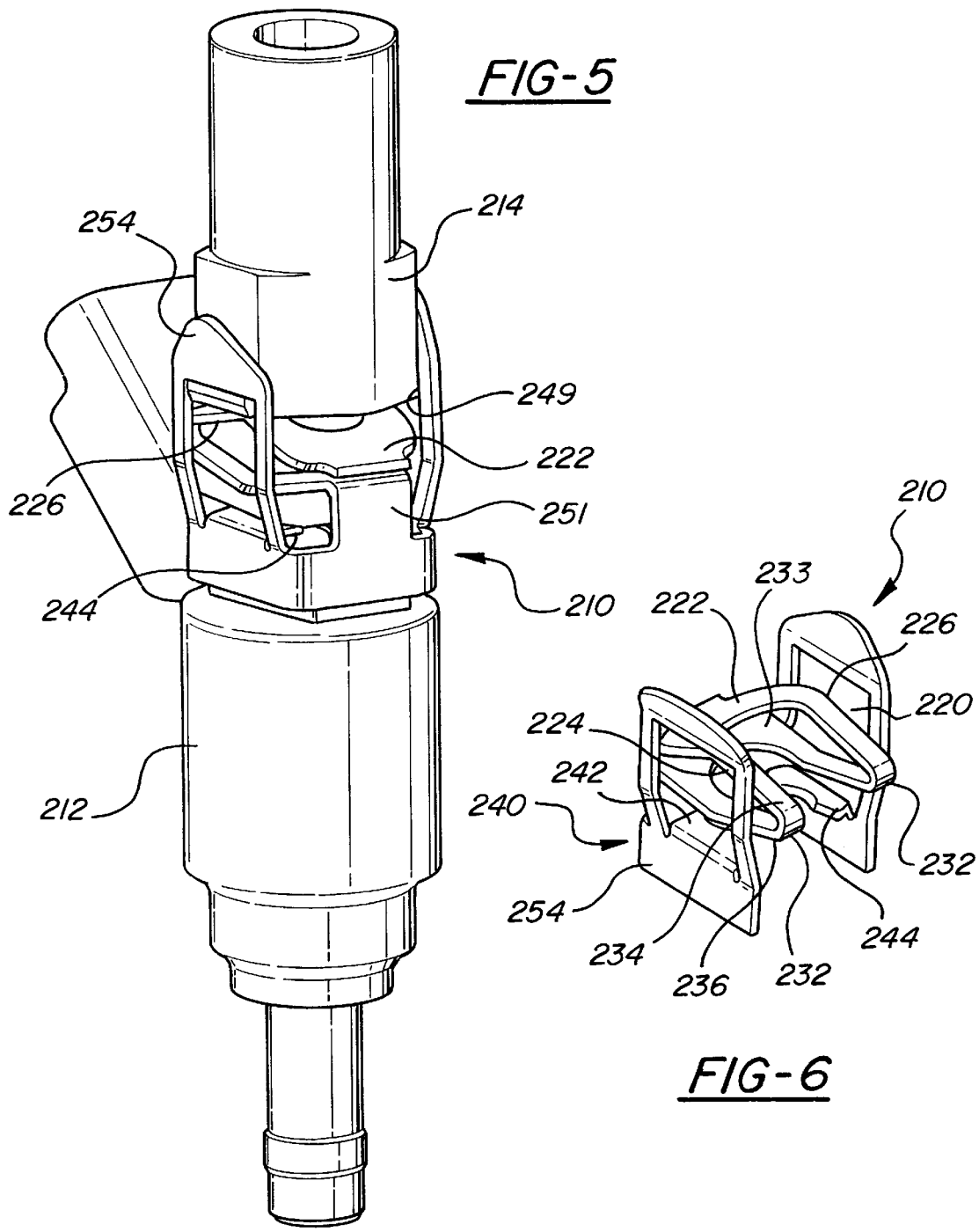

ns.
5,970,953

1
HIGH PRESSURE INJECTOR CLIP

FIELD OF THE INVENTION

This invention relates to the retention of a high pressure fuel injector in the head of an engine, and more particularly, to a spring clip for retaining together the fuel injector and a fuel rail cup and for urging the fuel injector toward the head of the engine.

BACKGROUND OF THE INVENTION

It is known in the art relating to the assembly of a fuel injector in a fuel rail cup to use a spring clip as the connecting member. In current fuel injector fuel rail assemblies, the spring clip is used to retain the injector in the fuel rail cup urging the injector into the fuel rail cup.

In a high pressure injector application, the injector is required to be held against the engine head with a force adequate to prevent the injector from moving during a combustion event. Conventional spring clips, because they work to suspend the injector between the fuel rail cup and manifold, are not suitable to be used in high pressure injector applications.

SUMMARY OF THE INVENTION

The present invention provides a spring clip for retaining together an internal combustion engine fuel injector and a fuel rail cup while forcing the fuel injector toward the head of the engine. More specifically, the spring clip of the invention is preloaded during installation and applies a spring force, ranging from a minimum force and increasing to a maximum force as the clip is compressed prior to yielding, urging the injector outwardly from the fuel rail cup. The clip is designed to yield at the maximum force applied to avoid overloading the injector while retaining its maximum resilient load.

In carrying out the invention, the spring clip includes a first portion including a bridge connecting spaced elongate fingers adapted to straddle a body portion of the fuel injector in a receiving portion of a fuel rail cup. The elongate fingers include a first reverse bend at a point therealong and extending therefrom. The bent elongate fingers define finger segments on each side of the reverse bend. The finger segments diverge from the reverse bend part way and converge thereafter to form spring elements.

A second portion having spaced legs for engaging slots in the injector body is defined by a terminal portion of the elongate fingers extending beyond a second reverse bend therein. When the injector is mounted in the fuel rail cup, the legs are received in slots in the injector body and the elongate finger segments are compressed between the fuel rail cup and injector body. The fuel injector is clamped between the legs and the fingers with a force toward the head of the engine by the compressive load on the finger segments.

In another embodiment of the invention, the spring clip includes a first portion including a bridge connecting spaced elongate fingers adapted to straddle a body portion of the fuel injector and be receivable in a receiving portion of a fuel rail cup. The elongate fingers include a reverse bend at a midpoint therealong and terminate in a bridging portion. The bent elongate fingers define finger segments on each side of the reverse bend. The finger segments diverge from the reverse bend part way toward the bridge and bridging portions and converge thereafter to form generally diamond shaped spring elements.

2

A second portion of a generally planar shape having spaced legs engages slots in the injector body. The second portion includes a wall portion extending generally perpendicular to the spaced legs and connects with the bridging portion. When the injector is mounted in the fuel rail cup, the legs are received in slots in the injector body and the elongate finger segments are compressed between the fuel rail cup and the injector body. The fuel injector is clamped between the legs and the fingers with a force toward the head of the engine by the compressive load on the finger segments.

Spring clips according to the invention are made of wire or stamped metal material or a combination of spring wire and stamped metal materials. The clip strength is controlled in the malleable range of the material allowing it to be deformed by excessive deflection caused by location tolerance variation. When the clip is compressed during installation, the spring force applied to the injector increases from a minimum preload condition to a maximum spring force. Initially, the clip is at its minimum force. As the clip is compressed, the spring force of the clip increases to a maximum spring force controlled by a set yield value of the clip. Upon yielding, the clip will retain its maximum spring force despite further deformation of the clip. This yielding of the clip prevents the force on the injector from becoming so great that it would damage the injector.

These and other features and advantages of the invention will be more fully understood from the following detailed description of the invention taken together with the accompanying drawings.

BRIEF DESCRIPTION OF THE DRAWINGS

The accompanying drawings, which are incorporated herein and constitute part of this specification, illustrate presently preferred embodiments of the invention, and, together with a general description given above and the detailed description of the preferred embodiments given below, serve to explain the principles of the invention.

FIG. 1 is a perspective view of a fuel injector, fuel rail cup assembly illustrating a wire spring clip retainer constructed in accordance with the present invention;

FIG. 2 is an elevational view of the fuel injector, fuel rail cup assembly of FIG. 1;

FIG. 5 is a perspective view of a fuel injector, fuel rail cup assembly illustrating another stamped spring clip constructed in accordance with the present invention;

FIG. 6 is a perspective view of the stamped spring clip in FIG. 5; and

DETAILED DESCRIPTION OF THE INVENTION

Figure 4:
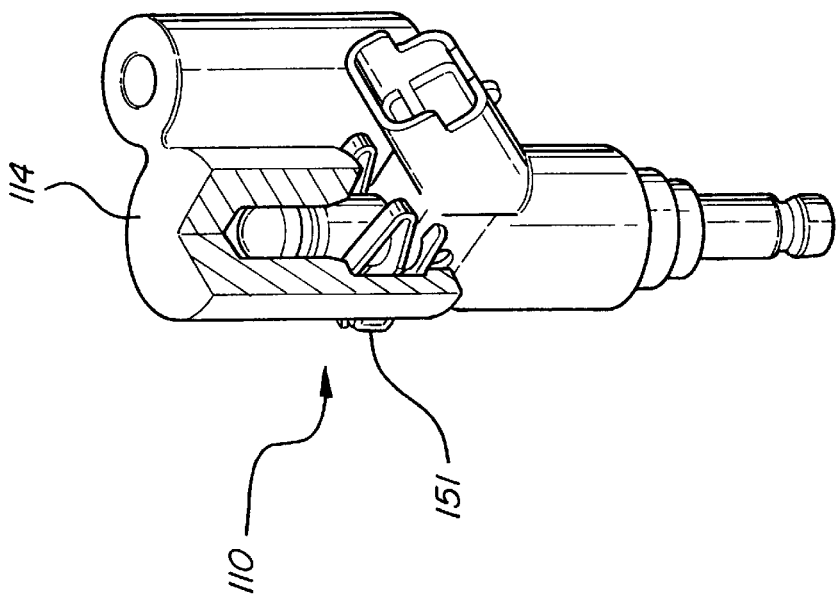
FIG. 4 is a perspective cut-away view of the fuel injector, fuel rail cup assembly of FIG. 3.

Referring now to the drawings in detail, spring clips constructed in accordance with selected embodiments of the present invention are generally indicated by reference numerals 10, 110, 210. Each spring clip is used for retaining together an associated high pressure fuel injector 12 and a fuel rail cup 14 while urging the injector into a cylinder head 16 (shown in FIG. 7) of an internal combustion engine. As is hereinafter more fully described, each spring clip 10, 110, 210 provides a spring force during installation, ranging from a minimum force and increasing to a maximum force as the clip is compressed prior to yielding, urging the fuel injector 12 outwardly from the fuel rail cup 14 to hold the injector down against the cylinder head 16 during engine combustion events. Each clip 10, 110, 210 is designed to yield at the maximum force applied to avoid overloading the injector while retaining its maximum load.

Referring to FIGS. 1 and 2 of the drawings, clip 10 is a wire formed spring clip including a first portion 20 having a bridge 22 connecting spaced elongate fingers 24, 26. Spaced elongate fingers 24, 26 straddle a body portion 28 of the fuel injector and are receivable in a receiving portion 30 of the fuel rail cup.

Elongate fingers 24, 26 include a first reverse bend 32 and define diverging finger segments 34, 36, diverging from the reverse bend part way and converging thereafter to form spring elements.

A second portion 40 having spaced legs 42, 44 for engaging the injector body is defined by a terminal portion of the elongate fingers 24, 26 extending beyond a second reverse bend 46.

In the embodiment of FIGS. 1 and 2, spaced legs 42, 44 engage crimp holes 50 in the injector body. Clip 10 is mounted in the fuel rail cup 14 and the spaced elongate fingers 24, 26 straddle flats 52 formed on either side of the fuel rail cup 14, clocking the clip and thus the injector 12.

Figure 7:
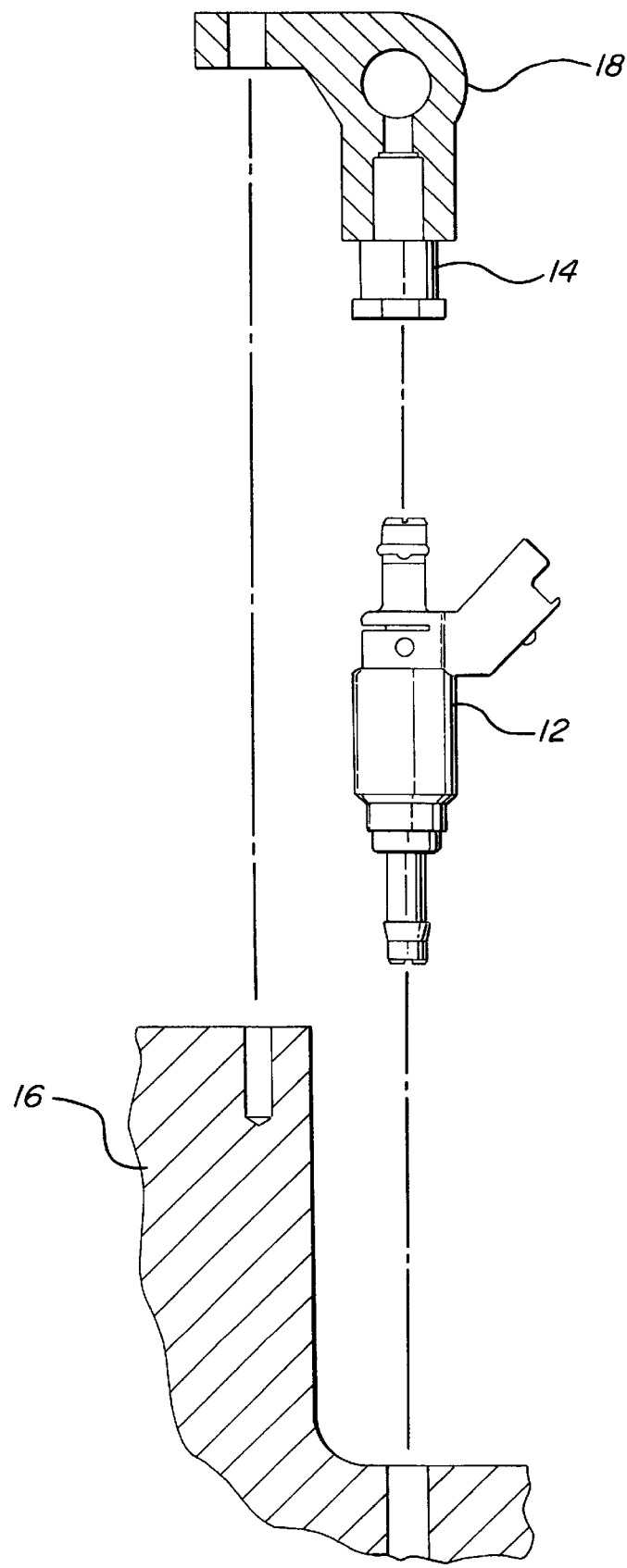
FIG. 7 is an exploded view of a fuel injector, fuel rail cup assembly mounting a high pressure fuel injector in an engine in accordance with the invention.

Clip 10 is preloaded as the elongate finger segments 34 are compressed between shoulders 54 created by machined flats 52 on the fuel rail cup diameter at the transition of flats 52 and the injector body, pushing the injector onto the injector head in an installed position (FIG. 7).

Referring to FIGS. 3 through 6 of the drawings, therein are illustrated two examples of a stamped form spring clip 110, 210. Clip 110 includes a first portion 120 having a bridge 122 connecting spaced elongate fingers 124, 126. Spaced elongate fingers 124, 126 straddle a body portion of the fuel injector and are receivable in a receiving portion 130 of the fuel rail cup 114.

Elongate fingers 124, 126 include a reverse bend 132 at a midpoint therealong and terminate in a bridging portion 133. The bent elongate fingers 124, 126 define finger segments 134, 136 on each side of the reverse bend 132. Finger segments 134, 136 diverge from reverse bend 132 part way and converge thereafter to form spring elements.

A second portion 140 of the clip 110 has a generally planar shape and includes spaced legs 142, 144 for engaging slots 148 in the injector body. Second portion 140 includes a wall portion 151 extending generally perpendicular to the spaced legs 142, 144 and connecting with the bridging portion 133.

Figure 3:
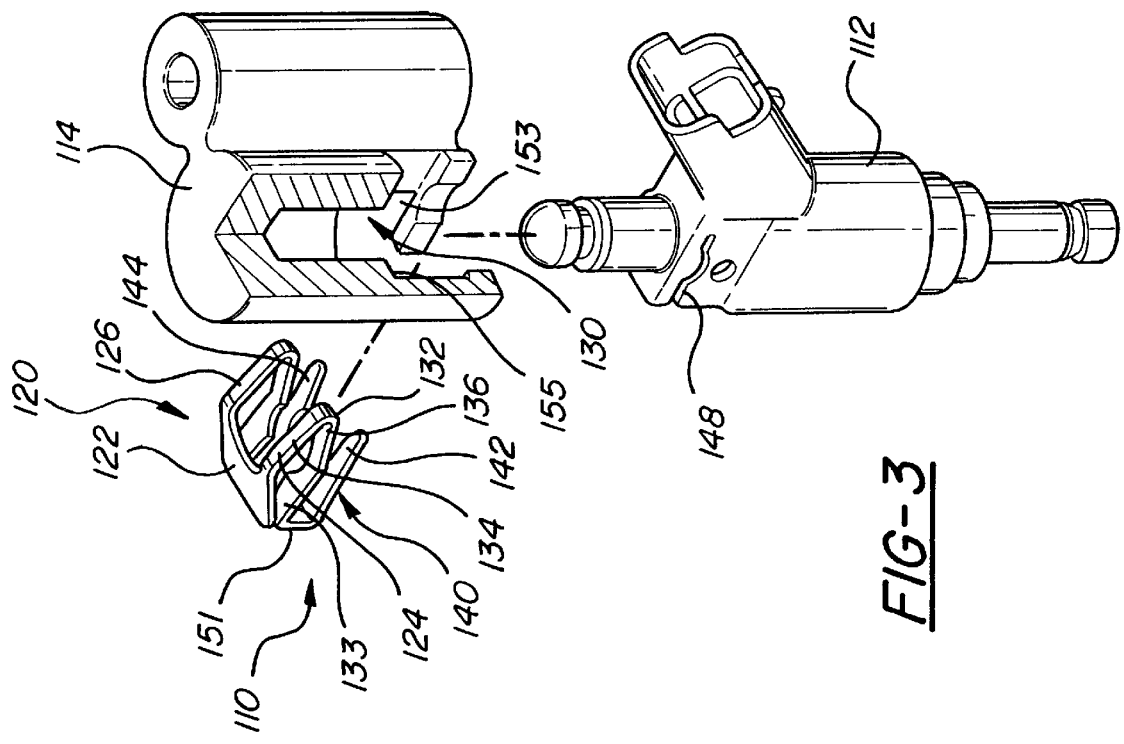
FIG. 3 is an exploded cut-away perspective view of a fuel injector, fuel rail cup assembly illustrating a stamped spring clip retainer constructed in accordance with present invention.

In the embodiments of FIGS. 3 and 4, the injector is mounted in the fuel rail cup. Spaced legs 142, 144 are received in slots 148 in the injector body and the elongate fingers 124, 126 are received in an aperture 153 having shoulders 155 in the fuel rail cup.

In the installed position of clip 110, elongate fingers 124, 126 are compressed between the fuel rail cup and the injector body, clamping the fuel injector between legs and fingers with a force toward the head 16 by the compressive load of the finger segments.

FIGS. 5 and 6 illustrate clip 210, a variation of clip 110, for external mounting on a fuel rail cup. Clip 210, in addition to the features of clip 110 which are referenced by corresponding reference numerals, includes wall portions 254 extending from and generally perpendicular to spaced legs 242, 244, for engaging tabs 249 on the fuel rail cup, clocking the clip 210 in the injector as described with reference to FIGS. 1 and 2.

Referring to FIG. 7, when the fuel injector 12 is installed into head 16, it bottoms out in a desired axial location on a controlled surface of the head. As the fuel rail 18 is fastened to the head, the fuel rail cup 14 is pushed further down over the injector. As well, the clip is deformed through compression, increasing its spring force from a minimum value to a maximum value prior to and upon yielding, at which point in the compression of the clip it takes on a permanent change in shape, or set. Clips 10, 110, 210 transfer the force resulting from the spring action from the injector cup 14 to the injector 12. This force on the injector 12 holds the injector against the engine head 16 during engine combustion events and, since the force cannot exceed the maximum value, avoids overloading the injector.

Clips 10, 110, 210 have unique attributes as required for a direct injection injector attachment. Unlike low pressure fuel rail assemblies, the high pressure injector must be held against the engine head with a force adequate to prevent the injector from moving during a combustion event. In an exemplary application, a minimum force has been generally determined to be 222 N (50 lb.). The maximum allowable force on the injector has been generally determined to be 444 N (100 lb.). Clips 10, 110, 210 must provide this force over a generally short travel distance of about 3.2 mm., which accounts for the tolerance variation of head, fuel rail and injector.

Clips 10, 110, 210 are preloaded in an extended position, such that the clips exert a force on the injector toward the head with the minimum force of about 222 N (50 lb.). Once compressed, in the installed position of the injector, the clip exerts a force on the injector toward the head, without exceeding the maximum allowable force of about 444 N (100 lb.).

Although the invention has been described by reference to specific embodiments, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A spring clip for retaining together an internal combustion engine fuel injector and a fuel rail cup, the injector being mounted in the head of an engine, said spring clip comprising:

a first portion including a bridge connecting spaced elongate fingers adapted to straddle a body portion of the fuel injector and be receivable in a receiving portion of a fuel rail cup;

said elongate fingers including a first reverse bend at a point therealong and extending therefrom, the bent elongate fingers defining finger segments on each side of said reverse bend;

said finger segments diverging from said reverse bend part way and converging thereafter to form spring elements; and a second portion having spaced legs for engaging the injector body;

said second portion spaced legs being defined by a terminal portion of said elongate fingers extending beyond a second reverse bend therein;

whereby, when the injector is mounted in the fuel rail cup, said legs are received in slots in the injector body and said elongate finger segments are compressed between the fuel rail cup and the injector body, clamping the fuel injector between said legs and said fingers with a force toward the head of the engine by the compressive load of said finger segments.

2. The spring clip of claim 1 therein said clip is made of spring wire material.

3. A spring clip for retaining together an internal combustion engine fuel injector and a fuel rail cup, the injector being mounted in the head of an engine, said spring clip comprising:

a first portion including a bridge connecting spaced elongate fingers adapted to straddle a body portion of the fuel injector and be receivable in a receiving portion of a fuel rail cup;

said elongate fingers including a reverse bend at a midpoint therealong and terminating in a bridging portion, the bent elongate fingers defining finger segments on each side of said reverse bend;

said finger segments diverging from said reverse bend part way toward said bridge and bridging portions and converging thereafter to form generally diamond shaped spring elements; and a second portion of a generally planar shape having spaced legs for engaging slots in the injector body;

said second portion including a wall portion extending generally perpendicular to said spaced legs and connecting with said bridging portion;

whereby, when the injector is mounted in the fuel rail cup, said legs are received in slots in the injector body and said elongate fingers are compressed between the fuel rail cup and the injector body, clamping the fuel injector between said legs and said fingers with a force toward the head of the engine by the compressive load of said finger segments.

4. The spring clip of claim 4 wherein said clip is made of stamped metal material.

5. The spring clip of claim 3 wherein said spaced legs include generally perpendicularly extending wall portions having apertures therein for engaging a body portion of said fuel rail cup.

6. A spring clip for retaining together an internal combustion engine fuel injector and a fuel rail cup, the injector being mounted in the head of an engine, said spring clip comprising:

a first portion including a fuel rail cup engaging portion; and a second portion including a fuel injector engaging portion;

at least one of said portions being deformable and exerting a spring force during installation ranging from a minimum force and increasing to a maximum force as the clip is compressed prior to yielding to urge said injector with a force toward the head of the engine mounting the injector therein, the clip yielding upon further compression to avoid overloading the injector while retaining said clip maximum resilient load.

7. A method of mounting an internal combustion engine fuel injector in the head of an engine for direct fuel injection comprising the steps of:

providing a fuel rail having a fuel rail cup for mounting the injector;

providing a yieldable spring clip that is preloaded upon installation to provide a minimum spring force and that has a preset maximum spring force prior to and upon yielding;

securing together said fuel rail cup and injector with said spring clip; and mounting said fuel rail to the engine, causing compression of said spring clip to at least its minimum preload and yielding to limit the spring force on the injector to said preset maximum;

whereby said spring clip clamps the injector toward the head of the engine without exceeding the maximum spring force.

8. A fuel injection system for direct injection of fuel into an internal combustion engine, said system comprising:

a fuel rail having a fuel rail cup;

a fuel injector mountable in the head of an engine and receivable in said fuel rail cup; and a spring clip maintaining the fuel injector and fuel rail in assembly and compressed against said injector outwardly from said fuel rail cup toward the head of the engine with a force not less than a determined minimum and not greater than a preset maximum controlled by yielding of the spring clip to limit the maximum load.

* * * * *